March 22, 1966 E. R. MICHALIK 3,241,938
MANUFACTURE OF GLASS SHEETS
Filed Jan. 15, 1963 4 Sheets-Sheet 1

INVENTOR.
EDMUND R. MICHALIK
BY
Oscar B. Spencer
ATTORNEY

March 22, 1966   E. R. MICHALIK   3,241,938
MANUFACTURE OF GLASS SHEETS
Filed Jan. 15, 1963   4 Sheets-Sheet 3

INVENTOR.
EDMUND R. MICHALIK
BY
Oscar L. Spencer
ATTORNEY

March 22, 1966     E. R. MICHALIK     3,241,938
MANUFACTURE OF GLASS SHEETS

Filed Jan. 15, 1963     4 Sheets-Sheet 4

INVENTOR.
EDMUND R. MICHALIK
BY
Oscar L. Spencer
ATTORNEY

United States Patent Office 3,241,938
Patented Mar. 22, 1966

3,241,938
MANUFACTURE OF GLASS SHEETS
Edmund R. Michalik, West Mifflin, Pa., assignor to Pittsburgh Plate Glass Company, Pittsburgh, Pa., a corporation of Pennsylvania
Filed Jan. 15, 1963, Ser. No. 251,545
6 Claims. (Cl. 65—99)

This application relates to the manufacture of flat glass by floating glass on a liquid bath, such as molten metal, so that the resultant flat glass has fire-finished surfaces requiring little or no additional surfacing for ultimate use.

It has been proposed heretofore to produce flat glass by floating a ribbon or sheet of glass upon the surface of a bath of molten metal. The product produced by this process has surfaces which differ somewhat from each other. The top surface thereof, because of the heat involved, has a fire-finished surface. The bottom of the ribbon in contact with the molten metal is flat and has a surface having a similar appearance to a fire-finished surface.

When producing float glass of compositions approaching that of commercial plate and window glass or like soda-lime glasses and using a molten metal such as a bath of tin or tin alloy, molten glass poured directly onto the bath of metal ultimately will attain an equilibrium thickness of approximately ¼ inch (hereinafter sometimes called "equilibrium thickness"). Even a preformed ribbon of glass of a thickness different from the equilibrium thickness when remelted while supported on the molten metal, will nevertheless seek the equilibrium thickness. Heretofore, when thinner glasses were desired, it was considered necessary to attenuate the ribbon of glass while in molten condition to produce thicknesses of glass differing from the equilibrium thickness or to subject a stiffened ribbon or sheet of a different dimension to only a surface melting treatment. Attenuation of the glass always introduces speed change problems with resultant dependent variables, such as ribbon width, glass tank gradient, etc. The attenuated glass is also inclined to have surfaces of inferior quality because of localized temperature differences which result in non-uniform attenuation and localized thickness differences which are amplified.

The need for glass of thicknesses different from the equilibrium thickness is great. For example, the majority of laminated glass assemblies useable in the automotive industry are constructed of two pieces of glass of a thickness less than the equilibrium thickness (usually of the order of ³⁄₁₆ or ⅛ inch) with a layer of plastic sandwiched therebetween.

According to this invention, it has been found that glass of conventional plate and window composition and of any desired thickness different from the described equilibrium thickness can be produced by floating a sheet or ribbon of glass on the surface of a molten bath of metal such as tin or tin alloy having a density greater than that of the glass and holding the glass at a melting temperature while modifying the apparent weight density of the glass with respect to the weight density of the metal of the bath. The molten glass tends to stabilize at a thinner thickness than the equilibrium thickness and vice versa. Thus, modifying the degree of immersion of the glass in the metal results in a modification of the amount of metal displaced by the glass which may be greater or less than that usually displaced dependent on the modification exacted.

Modification of the apparent weight density of the glass with respect to that of the metal may be accomplished effectively by reducing the fluid pressure adjacent the edges of the ribbon of glass while maintaining the fluid pressure over the major portion of the glass at substantially atmospheric pressure.

By selecting the magnitude of the pressure reduction on the metal bath adjacent the margins of the glass, and supplying a ribbon of desired thickness to the bath, the maintenance of this desired glass thickness is insured. If a ribbon of a thickness other than that which is desired is supplied to the metal bath then, because of the characteristic of molten glass to flow, a ribbon of the desired thickness can be produced by proper selection of the pressure which modifies the apparent densities of the glass with respect to the bath. Because of the temperatures involved, the glass attains surfaces characteristic of fire-finished surfaces, so that little or no subsequent abrasive surfacing is required for ultimate use.

When the treated glass is cooled sufficiently, it is withdrawn from the metal bath without surface damage due to equipment contact, as by applying only a tractive force to the glass ribbon. Since attenuation of the glass becomes less important, special apparatus within the confines of the metal bath or contiguous thereto to contact the glass surfaces and mar them is not required in contrast to previous processes. The process is an equilibrium process for controlling thickness because all variables become constant and there are no temperature gradient thickness variations in the finished ribbon.

Thus, a desired thickness of glass can be manufactured in ribbon form in a simple manner with low losses due to unuseable, defective glass.

According to an effective method of practicing the invention, a ribbon of glass is presized as to thickness and width by convenient means, such as by passing molten glass through a slot, i.e., an extrusion nozzle, or between sizing rolls and cooling the ribbon to stabilize its dimensions. This ribbon is then delivered onto a pool of molten metal having a greater density than that of the ribbon and the ribbon is floated on the surface of the metal during its movement thereacross. A sub-atmospheric pressure is created above the marginal portions of the metal bath. Adequate marginal seals are provided, so that the fluid pressure on the major surface of the glass is atmospheric or only slightly above atmospheric. At the same time the temperature of the ribbon is raised to a melting temperature. After the surfaces of the ribbon have improved, i.e., smoothed out, and surface defects have been eliminated or reduced in magnitude or number, the ribbon is cooled to a stiffened state and is removed from the metal.

According to a further embodiment, the ribbon may be delivered to the surface of the molten bath in a molten or substantially molten state and held molten until it has stabilized and the surface thereof has become smooth. The pressure differentials between that applied to the metal at the glass edges and that which exists over the central glass surface may be established as will become more apparent hereinafter.

To further describe the invention, attention is directed to the accompanying drawings in which like reference characters refer to like parts and in which.

Figure 1:
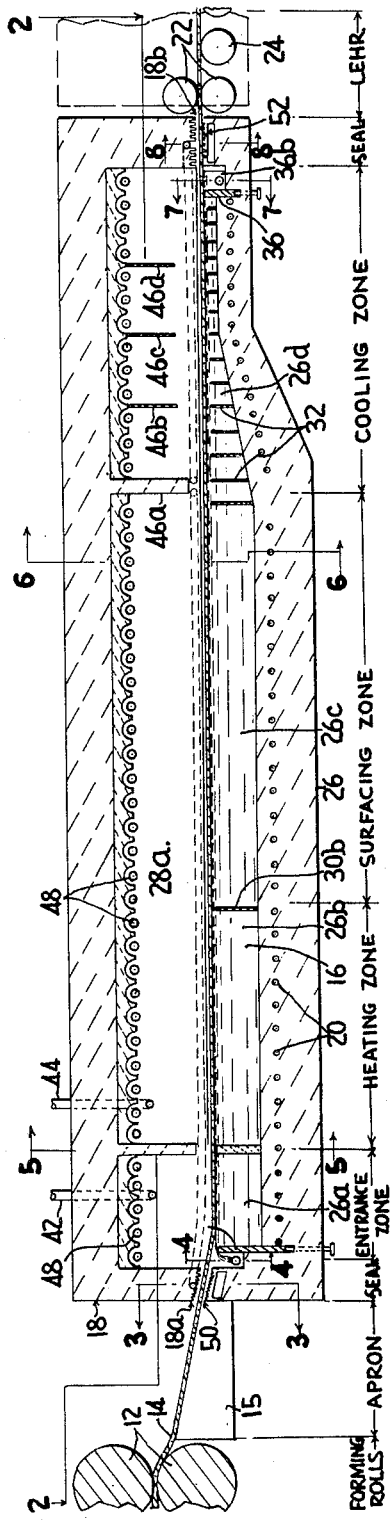
FIG. 1 is a longitudinal section of an apparatus for producing glass according to the inventive process herein contemplated showing means for selectively applying a super-atmospheric pressure to the top of a ribbon of glass supported on a molten metal bath.
Figure 2:
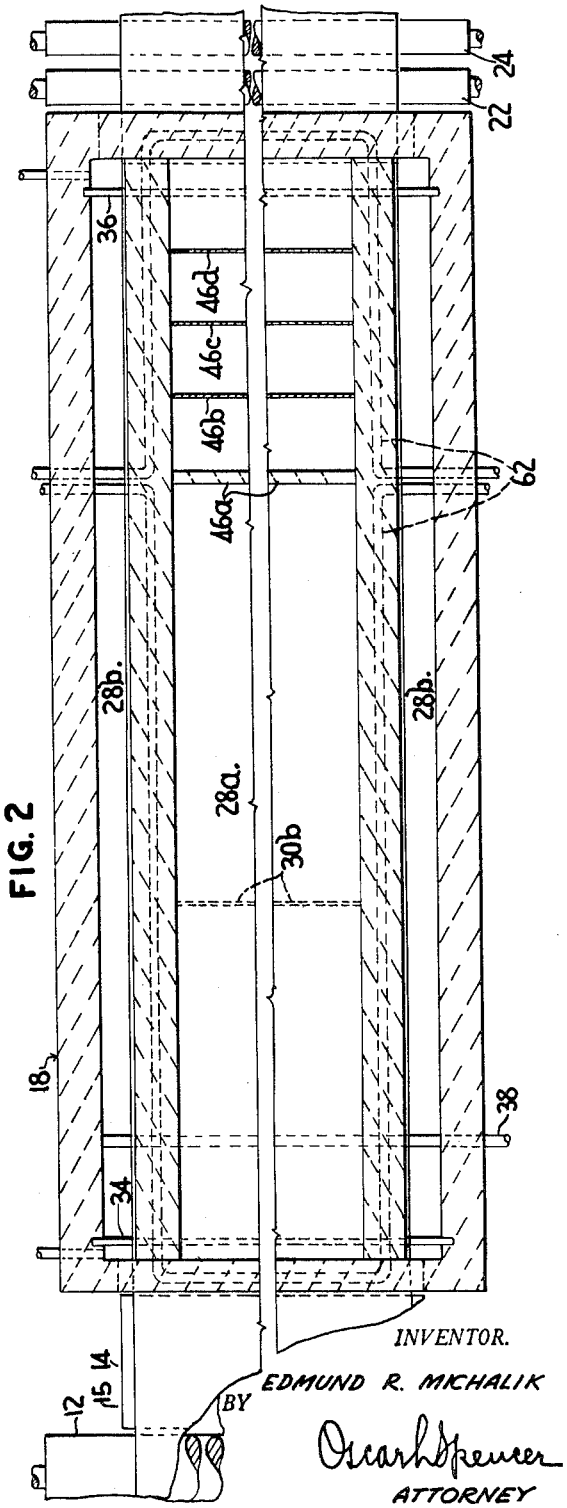
FIG. 2 is a horizontal sectional view taken on line 2—2 of FIG. 1 looking in the direction of the arrows showing a pair of forming rolls at the discharge end of a glass melting tank and the molten metal tank.
Figure 3:
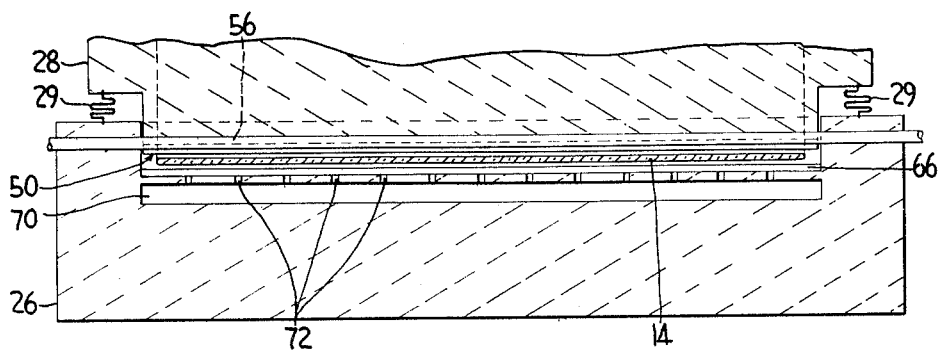
FIG. 3 is a sectional view taken on line 3—3 of FIG. 1 and in the direction of the arrows partly showing a seal at the entrance end of the molten metal tank.

With particular reference to the drawings, in FIG. 1 there is shown a pair of forming rolls 12 at the delivery end of a glass melting furnace of conventional construction (not shown) to form a ribbon of glass 14 which is delivered onto an apron arrangement 15 and thence onto the surface of a bath of molten metal 16 contained within a tank 18. The molten metal has a density greater than the glass ribbon 14, so that the ribbon floats on the surface of the molten metal. The metal may be tin, an alloy of tin, or the like.

In order to maintain the metal of the bath 16 in molten condition, thermal regulating means, such as electrodes 20 may be located in the floor of the tank 18, as illustrated, or may be submerged within the molten metal, so as to affect the temperature of the bath. The electrodes 20 are connected to a suitable source of power (not shown) in a conventional manner. Each electrode may be individually energized and controlled, so as to provide a desired thermal gradient within the various sections of the tank 18, as will be described. The glass ribbon 14, after treatment within the tank 18, is withdrawn from the tank without injury to its surfaces by traction or pinch rolls 22 onto a roller conveyor 24.

The tank 18 is constructed of a refractory bottom portion 26 and a refractory top portion 28, joined and sealed together, except for an entrance 18a and an exit 18b, by a suitable sealing means 29 (FIGS. 3, 5, 6 and 8). The sealing means illustrated is of a bellows type and permits the top portion 28 of the tank to be raised from the bottom portion 26 for repairs, etc., without the necessity of removing refractory parts and the subsequent repair of removed parts. The bottom portion 26 contains the molten metal 16 and is subdivided into an entrance zone 26a, a heating zone 26b, a surfacing zone 26c and a cooling zone 26d. These zones are defined by submerged walls or baffles 30a, 30b, and 30c, so built to materially reduce convection currents in the molten metal between the various zones. Other submerged baffles 32 are in the cooling zone to control convection currents in that zone. The level of the metal of the bath is controlled by a level control weir 34 at the entrance end of the tank 18, a level control weir 36 at the exit end of the tank and by an inlet 38. Preferably, the metal level is always maintained so that the glass ribbon being treated remains free of contact with any submerged wall or baffle within the tank 18. The inlet 38 (see FIG. 5) is located through a wall of the tank 18 and is connected to a suitable source of molten metal to supply molten metal to the tank 18. The level control arrangement of weirs 34 and 36 and other details of such control will be later described in detail.

The space between the top portion 28 and the surface of metal pool is divided into three chambers, a central chamber 28a and side chambers 28b, by longitudinal walls 40. These walls suspend from the roof 28 and are spaced from the walls of tank 18.

A gas which is inert to the components of the bath, such as nitrogen or the like, is introduced into the central gas chamber 28a through a conduit 42 connected to a suitable source of the gas (not shown). The gas is preferably heated, so as to eliminate chilling of the molten metal and the glass being treated. The chamber 28a is subdivided by walls or baffles 46a, 46b, 46c, 46d and 46e for temperature control purposes.

To provide a reduction in pressure on the metal adjacent the margins of the glass, vacuum pumps 43 are connected to conduits 44 connected with the chambers 28b. The gas removed from the chambers 28b will be substantially the inert gas. The gas may be recycled to the chamber 28a by suitable ducting, if so desired.

Radiant heaters 48 are located adjacent the roof of the tank 18 to maintain the desired glass temperature between the exit and entrance ends of the tank. These radiant heaters 48, located in both chambers 28a and 28b, as illustrated, are connected in a conventional manner to a source of electric power (not shown) and may be individually controlled for temperature gradient control. The control means is any conventional control means and need not be described and shown in detail. If necessary cooling means can be located above the cooling zone to insure the proper temperature of the glass being removed from the bath.

Figure 10:
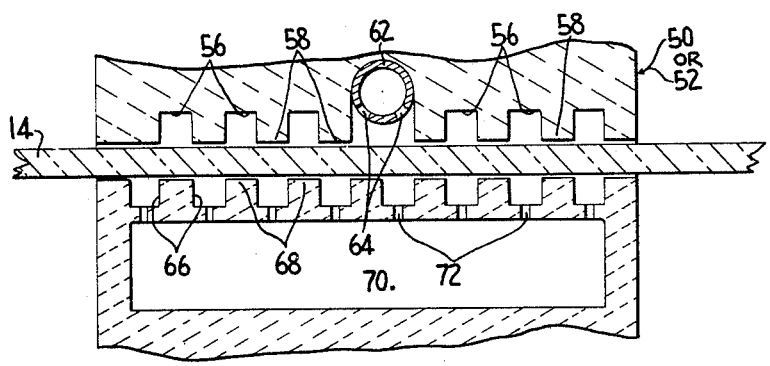
FIG. 10 is an enlarged view showing a typical pressure seal arrangement for the exit or entrance ends of the molten metal containing tank.

In order to maintain the pressure differentials between the chambers of the tank, and above the molten metal, various seals are used. A continuous seal arrangement is illustrated, which includes seals 50 and 52 at the entrance and exit ends, respectively, of the tank 18, and seals 54 associated with the walls 40. The top portion of seal arrangements 50 and 52 (illustrated in FIG. 10) and the seal arrangement 54 are similar in construction. Each includes a plurality of grooves 56 separated by lands 58, and a central or intermediate groove 60. The groove 60 receives a pipe 62 connected to a source of heated inert gas. The pipe 62 is provided with spaced orifices 64, so as to discharge a curtain of inert gas generally downwardly and toward or against the surface of the glass. As illustrated, there are two rows of orifices 64 spaced 90 degrees apart, each row discharging gas at an angle of approximately 45 degrees to the horizontal. The discharged gas flows outwardly and inwardly across the lands and grooves and the glass from its discharge location. The grooves cause turbulence in the discharge of gas and thus the gas flowing across the glass minimizes leakage of pressure gas from one chamber to another or to the atmosphere or the entrance of atmospheric air into a pressure zone. Sufficient leakage of gas into the edge chambers 28b occurs to prevent undue oxidization of the metal of the bath adjacent the side walls of the tank. The pressure of the gas is chosen to accomplish the pressure seal function.

To prevent undue chilling of the glass ribbon at least in the heating and surfacing zones, the gas introduced into the pipes 62 adjacent those zones is heated to at least the temperature of the bath, while the gas introduced into pipes 62 adjacent the cooling zone need not be so heated. Any suitable piping arrangement may be provided for accomplishing this purpose.

The entrance and exit seal arrangements 50 and 52 have a lower portion which also provides a gaseous support for the glass to prevent damage thereto from contact with the tank. Each lower portion includes a plurality of grooves 66 separated by lands 68, a plenum chamber 70 connected to a suitable source of inert gas under pressure, and a plurality of orifices 72 for passage of the gas from the plenum to the grooves. The lower seal arrangements can be constructed to be adjustable in vertical location. To accomplish this, they can be built on a taper with a screw adjustment. Thus, horizontal movement causes vertical location adjustment. Another arrangement is to construct the lower pressure seal as a unit or piston-like member fitting into a pressure chamber, so that variation in fluid pressure causes variations in vertical positioning.

The apron arrangement 15 may take several forms without departing from the spirit of the invention. For example, it may include a conventional series of rollers, as illustrated in U.S. Patent No. 1,954,077 to Gelstharp or it may be a slip table as illustrated in U.S. Patent No. 1,657,212 to Hitchcock.

Figure 4:
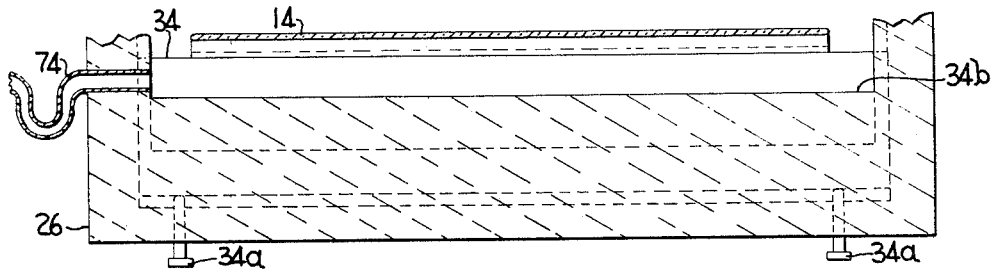
FIG. 4 is a sectional view taken on line 4—4 of FIG. 1 and in the direction of the arrows showing a liquid metal level control structure at the entrance end of the molten metal tank.
Figure 5:
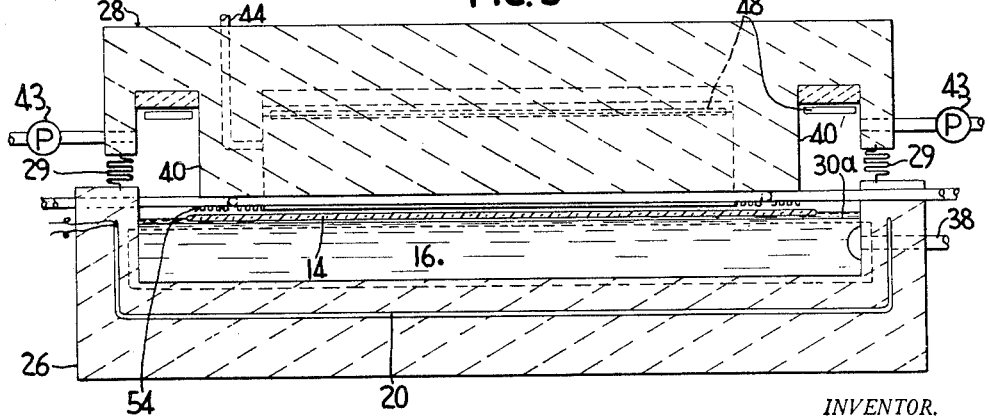
FIG. 5 is a sectional view taken on line 5—5 of FIG. 1 and in the direction of the arrows showing a wall and seal construction between the entrance and heating zones of the metal bath tank.
Figure 6:
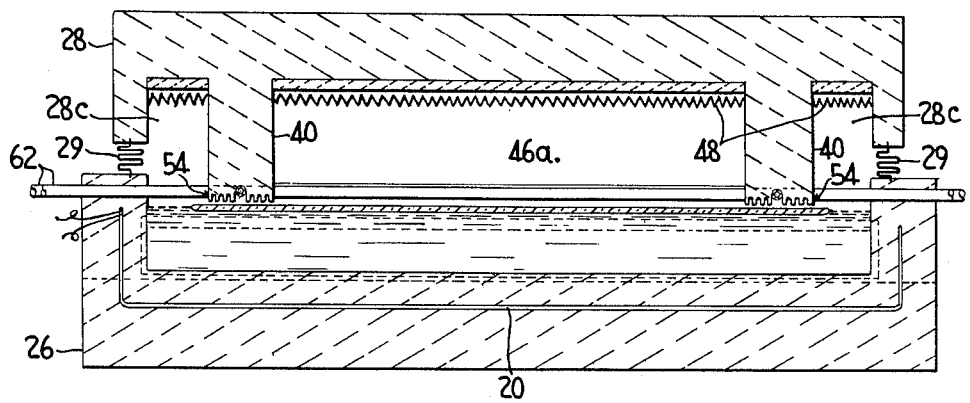
FIG. 6 is a sectional view taken on line 6—6 of FIG. 1 and in the direction of the arrows showing the surfacing zone and a tank wall construction.
Figure 7:
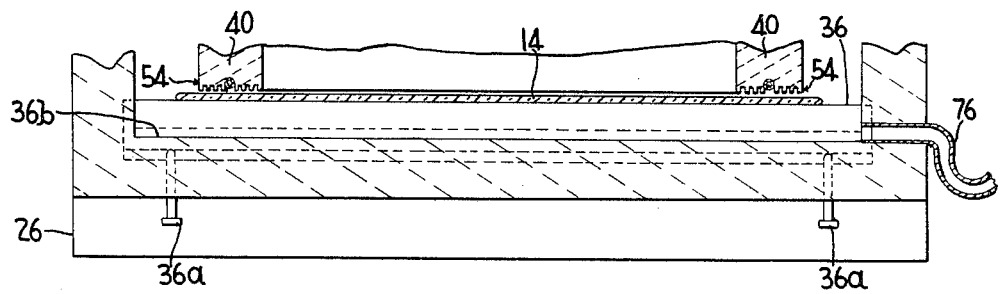
FIG. 7 is a sectional view taken on line 7—7 of FIG. 1 and in the direction of the arrows showing a molten metal level control structure at the exit end of the molten metal tank.
Figure 8:
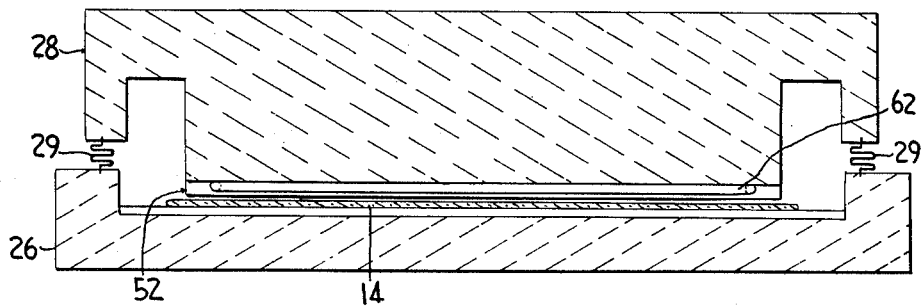
FIG. 8 is a sectional view taken on line 8—8 of FIG. 1 looking in the direction of the arrows showing the exit seal of the molten metal tank and indicating traction means for withdrawing the ribbon of glass.
Figure 9:
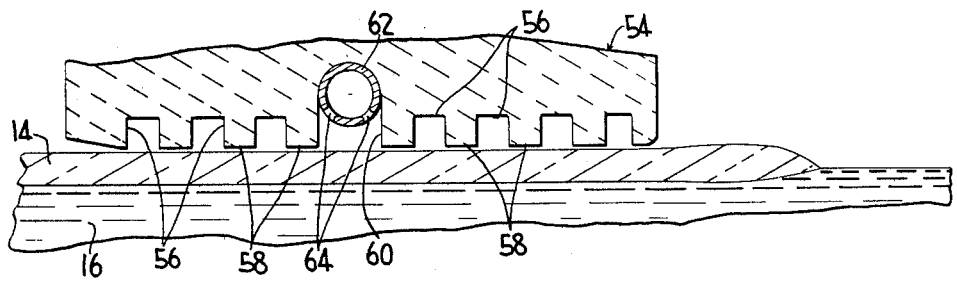
FIG. 9 is an enlarged view showing in detail the seal structure for the glass ribbon edge portions.

The level control means for controlling the level of the molten metal in the bath 16 includes the weirs 34 and 36 and the inlet 38. The weirs 34 and 36 are plates of a refractory material slidable within slots formed in the tank refractory parts. The weirs are vertically adjustable by suitable means, as screws 34a and 36a, respectively (FIG. 4), so as to adjust the molten metal level depending upon the thickness of glass being produced. Each weir defines one side of a trough 34b and 36b, respectively (FIG. 7), the other sides and bottoms of the troughs being defined by walls of the tank 18 or other suitable refractory material. Conduits 74 and 76 pass through the walls of the tank 18 and communicate at one end with the troughs 34b and 36b, respectively. Each conduit is connected to discharge molten metal into a sump (not shown) for regeneration and reheating and from which molten metal is pumped to the tank 18 through the inlet 38. Each conduit 74 and 76 is provided with a trap, i.e., a U-bend in the conduit, so as to prevent the entrance of atmospheric air into the tank 18 which would cause oxidation of the metal of the bath.

In the operation of this device a ribbon of glass is formed by passage of molten glass between a pair of forming rolls 12 from a source thereof, such as a conventional glass melting tank, and the ribbon 14 is delivered to the front section of the tank 18 passing through the front or entrance seal 50.

Gas which is inert to the metal is fed into a pipe 62 and flows downwardly impinging against the glass and thereby isolates the interior of the tank 18 from the outside atmosphere. A similar gas is supplied to the plenum chamber 70 under pressure high enough to cause the gas in this chamber to flow through the orifices into the grooves 66 and to hold the ribbon away from the solid parts of the tank.

In general, this gas is preheated by means not shown to a temperature sufficient high to prevent undue cooling of the glass. Normally, the temperature of the gas supplied to pipe 62a and chamber 70 will be above 500° to 1000° F. and often in the range of 1400° F. up to a melting temperature of the glass.

After the ribbon 14 has entered chamber 28a it is laid upon the surface of the molten metal. As shown in the drawings, the ribbon 14 has a width greater than that enclosed by the walls 40 thus providing a narrow margin which extends beyond the edges of the walls 40 into the chambers 28b. Sealing gas is delivered to the pipes 62, disposed in the walls 40 and caused to impinge against the edge portions of the ribbon 14 which is immediately below the walls 40, thereby separating the chambers 28a and 28b by a gaseous curtain. The temperature of the gas supplied to the wall seals in front of baffle 46a generally should approximate a melting temperature of the glass or at least should be high enough so as to avoid cooling the ribbon edges below a melting temperature.

The ribbon 14 while floating on the metal surface advances through the chamber 28a and finally is withdrawn from the tank 18 passing through the seal 52. It is pulled from the tank between the traction rolls 22 which may, if desired, or if necessary, exact enough tension upon the ribbon to keep it moving.

As the ribbon 14 passes through the chamber 28a, the temperature is maintained high enough to cause the ribbon to become molten during a substantial distance of its path. During this time the surfaces of the ribbon smooth out and the ribbon seeks an equilibrium thickness the magnitude of which is dependent upon the pressure reduction established within the chamber 28b.

The pressure reduction required to be established in the chamber 28b depends upon the thickness desired and the actual pressure in the chamber 28a. Where it is desired to produce a ribbon thinner than the aforesaid equilibrium thickness, i.e., about 0.27 inch, the pressure in the chamber 28b should be at least 0.1 ounce per square inch below that pressure in the chamber 28a.

For example, the ribbon tends to stabilize at a thickness of 3/16 inch when the pressure differential is 0.11 ounce per square inch.

The degree of stabilization is a function of time. Consequently, it is readily possible to produce glass 0.125 inch in thickness simply by sizing the thickness of the ribbon at this thickness or slightly lower, subjecting the sized ribbon to the treatment herein contemplated at a suitable pressure differential of about 0.5 ounce per square inch, which includes improving its surfaces, and removing the sheet before its thickness can grow unduly.

In general, the pressure differential established between the chamber 28b and in the chamber 28a ranges from 0.01 to 2 ounces per square inch. Highly differential pressures normally are unnecessary and may be difficult to maintain. They should in no event be so high as to cause the ribbon to break and rarely are above 5 to 10 ounces per square inch.

The temperature established in the fore part of the chamber 28a is a melting temperature of the glass of the ribbon. Toward the end, i.e., beyond baffle 46a the temperature is reduced low enough to ensure delivery of a stable ribbon which is not marred by contact with rolls to the discharge end of the tank, for example, 600 to 800° F. or below.

The rate of movement of the ribbon over the pool is controlled so as to ensure a smoothing of the surfaces of the ribbon and in general this is best accomplished by bringing a section of the ribbon to molten state.

EXAMPLE I

A ribbon of glass of convenient width, for example, 12 inches or more, having a composition, by weight, of 71.38 percent $SiO_2$, 13.26 percent $Na_2O+K_2O$, 11.76 percent CaO, 2.54 percent MgO, 0.75 percent $Na_2SO_4$, 0.15 percent $Al_2O_3$, 0.11 percent $Fe_2O_3$ and 0.06 percent NaCl and a weight density of 2.542 grams per cubic centimeter is formed by a pair of rolls to a thickness of substantially .125 inch and delivered at 1400° F. and floated upon the surface of a molten bath of metal of 100 percent tin having a weight density of 6.52 grams per cubic centimeter at 1800° F. The tank of molten metal is of the construction illustrated in the drawing and is longitudinally divided into three sections, an entrance section the metal of which is maintained at a temperature of 1500° F., a melting section the metal of which is maintained at a temperature of 1900° F. and a cooling section in which the metal is at a temperature ranging from 1900° F. to 1000° F. The space above the metal is subdivided into three chambers and gas is withdrawn from the edge chambers to reduce the pressure therein and to establish a pressure differential between those chambers and the central chamber. The gas which is inert to the molten metal and introduced into the central chamber is preheated to 1900° F. for this supply. The central chamber 28a is maintained at or just slightly above atmospheric pressure while the chambers 28b are maintained at minus 0.5 ounce per square inch gauge pressure, so that a pressure differential of 0.3 ounce per square inch existed between the two chambers.

The width of the ribbon is greater than the width of the central chamber so that the margins of the ribbon extend laterally beyond the outer side edge of the chamber. The pressure over the extending margin is less than atmospheric. The glass is heated from above to a temperature of 1900° F. in the central chamber to remelt the ribbon throughout its entire thickness in a section across the entire width of the ribbon under the chamber and is then cooled to 1000° F. at the exit of the molten metal tank after which it was withdrawn from metal contact. The ribbon thickness remains at substantially .125 inch and the surfaces are fire-finished and flat except for the edges which are bulbed.

The central and side chambers are separated by a gas curtain as illustrated in the drawing wherein the gas is delivered under a slight positive pressure. Leakage of gas to the chambers 28b prevents oxidation of the metal of the bath.

EXAMPLE II

A circle of glass having a diameter of 10 inches and a thickness of 0.194 inch, whose composition was by weight 73.00 percent $SiO_2$, 13.24 percent $Na_2O+K_2O$, 8.44 percent CaO, 3.53 percent MgO, 0.42 percent $Na_2SO_4$, 1.28 percent $Al_2O_3$ and 0.09 percent $Fe_2O_3$ with a density of 2.501 grams per square centimeter was preheated to 700° F. and centrally placed on a bath of molten tin (100 percent) having a density of 6.52 grams per square centimeter at 1800° F. within a furnace. The glass floated on the surface of the molten tin. A cup-shaped graphite head 7.82 inches in diameter having a cavity 7.37 inches in diameter was lowered so that the lower extremities of its walls were within 0.004 inch from the surface of the glass on the bath. A gas inert with respect to the glass and the tin and composed of 93 percent nitrogen and 7 percent hydrogen by volume, with a dew point of minus 70° C. was preheated to approximately the same temperature as the bath in the heating chamber and was fed centrally to the heat into the cavity enclosed by the walls thereof. Leakage between the walls and the glass occurred, so that the gas was fed into the head at 0.46 ounce per square inch and this pressure was maintained in the cavity. The area outside the head within the furnace was evacuated by a vacuum pump to establish a pressure differential of 0.17 ounce per square inch between the interior and exterior of the head.

The glass and the tin bath were heated simultaneously to 1800° F. at a rate of approximately 340° F. per hour and were held at 1800° F. for 20 minutes. The glass and the tin bath were then cooled to 700° F. at a rate of approximately 200° F. per hour. The glass was then removed from the bath without damage.

The glass circle thickness was measured and was found to have a marginal portion approximately 7.37 inches in inside diameter, 0.247 inch in thickness, and a center portion depressed to a thickness which ranged from 0.150 inch at its edges to 0.180 inch at its center. The bottom of the glass exhibited a smooth flat surface. The top surface exhibited a fire-polished finish.

Various other embodiments of the process may be practiced. For example, the ribbon may be supplied substantially at melting temperature to the molten metal, held molten for a period and then gradually cooled.

In lieu of molten tin or tin alloy, other stable molten materials having a greater density than the glass of the ribbon may be used including: lead, lead-zinc alloys, lithium or the like, and metal salts such as copper chloride, lead chloride, and like materials which have a density above about 2.5 and are stable, essentially non-volatile, liquids at the melting temperature of the glass treated.

While the use of an intermediate gas partition is an effective seal, it will be understood that other means may be resorted to. For example, the lower ends of walls 40 may be disposed so close to the top of the ribbon that only sufficient leakage occurs to maintain the metal of the bath free of oxidation.

Although the present invention has been described with reference to certain specific details, it is not intended that such details shall be regarded as limitations upon the scope of the invention except insofar as included in the accompanying claims.

I claim:

1. In a process of producing glass sheet wherein the glass is supported on a liquid having a density greater than that of the glass and the glass when molten and allowed to flow freely on said liquid tends to naturally attain an equilibrium thickness, the improvement which comprises floating a layer of glass at its melting temperature on said liquid, subjecting an area of the upper surface of the glass within the edges thereof to substantially atmospheric fluid pressure, and subjecting liquid outside and in contact with the glass to a fluid pressure less than atmospheric, thereby controlling the thickness of the glass within the edges thereof so as to be different from said equilibrium thickness.

2. In a process of producing glass sheet wherein the glass is supported on a liquid having a density greater than that of the glass and the glass when molten and allowed to flow freely on said liquid tends to naturally attain an equilibrium thickness, the improvement which comprises floating a layer of glass at a temperature at which it flows on said liquid, subjecting an area of the upper surface of the glass inwardly of the edges thereof to substantially atmospheric fluid pressure, and subjecting a marginal area of the glass and liquid immediately outside the marginal area thereof to a fluid pressure less than atmospheric, thereby controlling the thickness of the inward area of the glass so as to be different from said equilibrium thickness.

3. A method of treating glass which comprises floating a ribbon of glass on a pool of molten metal, maintaining a section of the floating glass across the ribbon at its melting temperature, applying an atmospheric fluid pressure to the upper surface of a central area of said section within the sides thereof, and applying a fluid pressure less than atmospheric to the surface at the sides of said section.

4. In a process of producing glass wherein the glass is supported on a liquid having a density greater than that of the glass and the glass when allowed to flow freely tends to naturally attain an equilibrium thickness which comprises, forming a ribbon of glass, floating the formed ribbon on a bath of liquid, heating the ribbon so that it becomes a molten layer of glass and continuing to float the molten glass on said liquid applying atmospheric pressure to a portion only of the upper surface of said layer of molten glass within the edges thereof while being heated, and applying a fluid pressure less than atmospheric to liquid outside and in contact with the glass, thereby controlling the thickness of the glass within the edges thereof.

5. In a process of producing a ribbon of glass wherein the glass is floated on a liquid bath so as to have a fire-finished surface and the glass when allowed to flow freely tends to assume an equilibrium thickness, the improvement which comprises, advancing the glass ribbon on the surface of a liquid bath under heat conditions which transform the ribbon into a layer of molten glass, applying an atmospheric gas pressure to the upper surface of the glass within the edges thereof, applying a gas pressure of less than atmospheric to liquid outside and in contact with the glass, controlling the difference in pressure so applied to bring the glass to a predetermined thickness different from said equilibrium thickness obtainable in the absence of the pressure differential, then cooling the glass at its predetermined thickness and removing the so-cooled glass from the liquid bath.

6. In a method of treating glass wherein a glass ribbon is supported upon a liquid bath and at a temperature at which the viscosity of the glass which permits dimensional changes of the ribbon through viscous flow of the glass, the steps comprising, forming a ribbon of a predetermined size having a thickness less than that which tends naturally to be formed when molten glass is supported on the liquid bath, depositing said ribbon upon and advancing it along said liquid bath while first remelting the ribbon throughout its thickness and thereafter cooling said ribbon to a temperature at which its dimensions become stable, exerting atmospheric pressure upon at least a portion of the unsupported side of the ribbon within the edges thereof during remelting, and exerting a fluid pressure less than atmospheric on the liquid outside and in contact with the glass, the differences in pressure being sufficient to reduce the tendency of the dimensions of said ribbon to change.

References Cited by the Examiner

UNITED STATES PATENTS 2,911,759  11/1959  Pilkington et al. _____ 65—65

FOREIGN PATENTS 732,043  2/1943  Germany.

DONALL H. SYLVESTER, *Primary Examiner.*